Aug. 16, 1960   J. M. LESINSKI   2,949,333
WATERTIGHT BEARING HOUSING CONSTRUCTION
FOR DYNAMOELECTRIC MACHINES
Filed Oct. 1, 1958

WITNESSES

INVENTOR
Jeanne M. Lesinski
BY
ATTORNEY

United States Patent Office 2,949,333  
Patented Aug. 16, 1960

2,949,333

WATERTIGHT BEARING HOUSING CONSTRUCTION FOR DYNAMOELECTRIC MACHINES

Jeanne M. Lesinski, Buffalo, N.Y., assignor to Westinghouse Electric Corporation, East Pittsburgh, Pa., a corporation of Pennsylvania Filed Oct. 1, 1958, Ser. No. 764,707

3 Claims. (Cl. 308—187.1)

The present invention relates generally to dynamoelectric machines, and more particularly relates to watertight housings for motors.

Many specifications for watertight motors, particularly deck-service motors for shipboard use, require that the motor enclosure be capable of withstanding a 60-minute hose spray without detrimental effect upon the motor. The chief obstacle to meeting these specifications is the leakage of liquid into the motor along the shaft. Heretofore, a rubbing seal type of construction has been used but has proven undesirable due to wear of the seal when operating dry as it would do under normal conditions. Excessive wear of the dry seal requires that it be repeatedly replaced which is a costly and time consuming procedure.

Another source of water leakage into the motor enclosure which has proven to be a difficult problem is the leakage of liquid into the housing along the bearing cap bolts which extend through the motor end bracket and secure the inner bearing cap.

The principal object of my invention is a construction for dynamoelectric machines capable of substantially preventing leakage of water into the machine when operating under severe conditions of service.

Another object of my invention is to provide a dynamoelectric machine construction capable of preventing leakage of liquid into the machine where the shaft extends out of the machine housing.

Another object of my invention is to provide a dynamoelectric machine construction capable of preventing leakage of liquid into the enclosure from around the bearing cap bolts.

Figure 1:
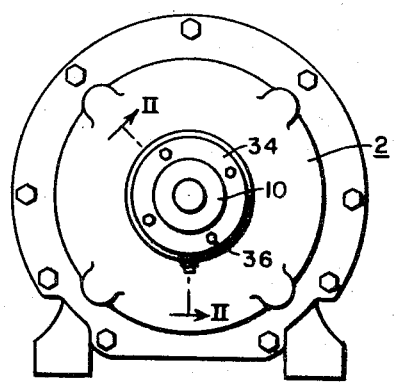
Figure 2:
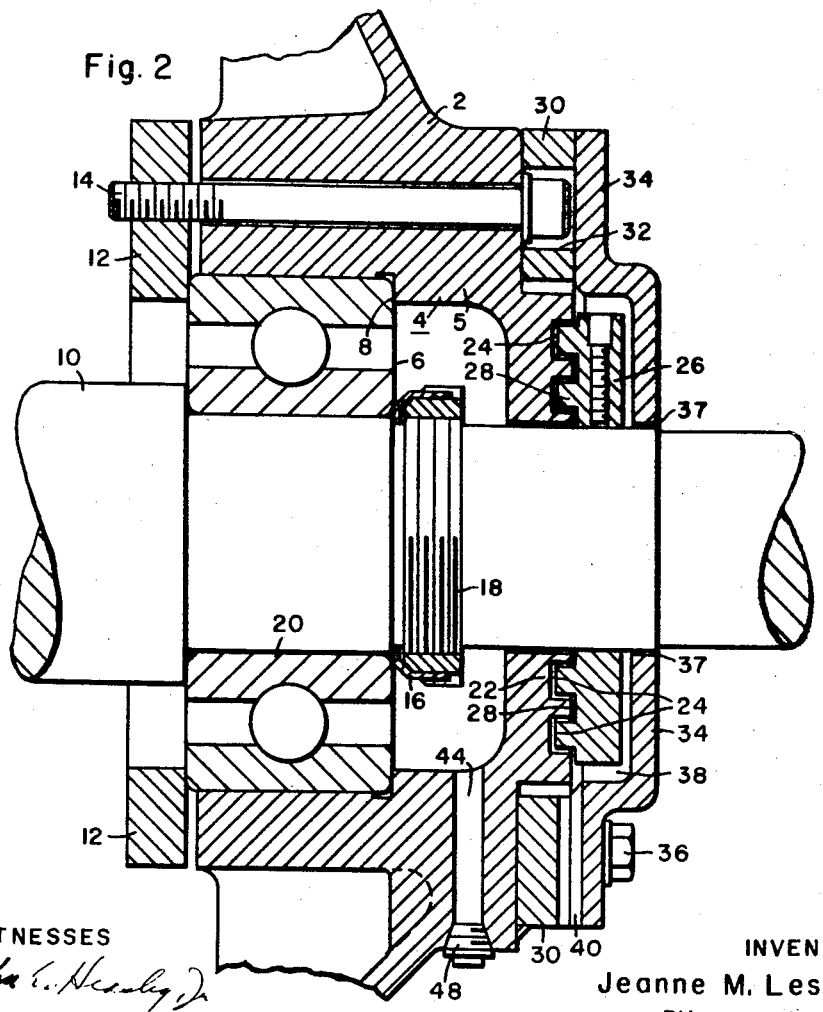

Further objects and advantages of my invention will be seen from the following detailed description, taken in conjunction with the drawings, in which:

Figure 1 is an end elevation view of a dynamoelectric machine embodying my invention; and Fig. 2 is a cross-sectional view, somewhat enlarged, taken along the line II—II of Fig. 1.

While my invention has application in any type of dynamoelectric machine that is to be watertight, it is illustrated as embodied in a motor having an end bracket 2 which has a bearing cavity 4 in a hub portion 5 of the end bracket 2. A suitable bearing 6, shown as an antifriction bearing, abutting an internal shoulder or bearing seat 8 within the cavity 4, rotatably supports a shaft 10 extending through the end bracket 2. An inner bearing cap 12, secured by bearing cap bolts 14, urges the bearing 6 into position against the bearing seat 8. The bearing cap bolts 14, which are threaded into the inner bearing cap 12, extend through the end bracket 2 to the outside of the motor. A bearing lock nut 16 and washer 18 may be used to position the inner race 20 of the bearing 6 on the shaft 10.

The outboard side 22 of the end bracket 2 has concentric grooves 24 therein. A flinger 26 mounted on the shaft 10 has annular ridges 28 which cooperate with the grooves 24 to form a rotating seal such as is sometimes used for motors required to meet spray-tight specifications. Flingers of this type are satisfactory in many cases, but where the impact of the water is continued and severe, they are incapable of adequately throwing off the water directed towards the machine.

As mentioned previously, a motor for specifications requiring watertight construction must also eliminate water leakage into the housing along the bearing cap bolts 14, as well as along the shaft 10 extending through the end bracket 2.

An annular member 30 is welded to the hub portion 5 or secured thereto in any other suitable manner. The annular member 30 has openings 32 appropriately positioned to allow access from the outside of the motor to the bearing cap bolts 14. A plate 34 is secured tightly to the annular member 30 by means of bolts 36. The plate 34 is mounted on the annular member 30 so as to cover the openings 32. The plate 34 thereby eliminates leakage along the bearing cap bolts 14 by covering the bolts 14 so water cannot get to them. In addition, the plate 34 has a close clearance with the shaft at 37 thereby limiting the impact of water or other liquid directed at the end bracket 2 against the flinger 26. The plate 34 is saucer-shaped in form but it is to be understood that any suitable configuration may be used which will provide a tight fit against the annular member 30.

By limiting the impact of liquid upon the flinger 26, the flinger 26 can adequately protect the motor from leakage into the housing. A slot 40 is machined radially in the plate 34 and in the annular member 30 to form a relief opening allowing a drain for water from the space 38 between the plate 34 and flinger 26. The drain is made to have a cross-sectional area not less than the total cross-sectional area of the close clearance 37 between the plate 34 and shaft 10. Water can then drain from the space 38 as fast as it is likely to enter, thus preventing any accumulation of water in the space 38. Another opening or drain 44 is formed within the hub portion 5 to permit drainage in case any liquid should get around the flinger 26 and enter the bearing cavity 4. This drain 44 is normally closed by a plug 48 which will allow any water getting into the cavity 4 to be drained from time to time. The cavity 4 and the running seal between the hub portion 5 and the flinger 26 are filled with a waterproof grease to further retard the flow of water into the motor housing.

It is to be noted that heretofore a conventional rubbing type of seal has been necessary to comply with specifications requiring watertight enclosures for dynamoelectric machines. Such rubbing seals were unsatisfactory when operated dry without liquids to lubricate and extend the life of the seal. My invention has provided a dynamoelectric machine construction capable of preventing water or any other liquid to enter the motor housing. My invention uses a non-rubbing seal capable of operation without ill effect in the absence of water impinging upon the housing. At the same time leakage along the bearing cap bolts and along the shaft is sufficiently prevented to meet specifications for watertight motors.

If desired, the annular member 30 could be made integral with the end bracket 2. With this arrangement the end bracket 2 would have countersunk openings therein corresponding to the openings 32 to receive the bearing cap bolts 14. The plate 34 would then be secured onto the end bracket 2 by means of bolts 36 tapped into the end bracket 2. In this way the leakage along the bearing cap bolts is eliminated in the same manner described above. The bolts 36 securing the plate 34 to the end bracket 2 in this case would not extend through the end bracket but merely thread into the end bracket so that water leakage along these bolts would not enter the machine housing.

The invention has been described in a particular embodiment for the purpose of illustration, but it will be apparent that its usefulness is not limited to this particular application but is generally applicable to any rotating machine requiring a watertight seal. While certain specific embodiments have been shown and described for the purpose of illustration, it is to be understood that all modifications, alterations and equivalents within the scope of my invention are meant to be included.

I claim as my invention:

1. In a dynamoelectric machine including an end bracket having a bearing cavity, a shaft extending through said end bracket, a bearing within said cavity rotatably supporting said shaft, a bearing plate on the inner side of said bearing, bolts extending through said end bracket securing said bearing plate against said bearing, a flinger mounted on said shaft, said flinger and the outboard side of the end bracket cooperating to form a close running seal, an annular member secured to the end bracket, said annular member having open ended recesses, said bolts having their heads completely within said recesses, a saucer-shaped plate secured to said annular member and covering the flinger and said openings, said plate having a close clearance with said shaft.

2. In a dynamoelectric machine having an end bracket, a bearing housing centrally located on said end bracket, a bearing supported in said bearing housing, a shaft rotatably journaled in said bearing and extending through said end bracket, sealing means comprising cooperating means mounted on said shaft and said end bracket to form a rotating seal, an inner bearing cap on the inner side on said bearing housing, an annular flange on the outer side of said bearing housing, said flange having circumferentially spaced open ended recesses in alignment with openings through said bearing housing, openings in said inner bearing cap in alignment with said recesses and said bearing housing openings, a bolt received in each of said sets of aligned openings for retaining said bearing cap in position, each of said bolts having its head completely within a recess, a sealing plate secured to said flange covering said openings and said sealing means, said plate having a close clearance with said shaft.

3. In a dynamoelectric machine having an end bracket, a bearing housing centrally located on said end bracket, a bearing supported in said bearing housing, a shaft rotatably journaled in said bearing and extending through said end bracket, sealing means comprising cooperating means mounted on said shaft and said end bracket to form a rotating seal, an inner bearing cap on the inner side on said bearing housing, an annular flange on the outer side of said bearing housing, said flange having circumferentially spaced open ended recesses in alignment with openings through said bearing housing, openings in said inner bearing cap in alignment with said recesses and said bearing housing openings, a bolt received in each of said sets of aligned openings for retaining said bearing cap in position, each of said bolts having its head completely within a recess, a sealing plate secured to said flange covering said openings and said sealing means, said plate having a close clearance with said shaft, and drain means for draining liquid from the space between the end bracket and the sealing plate, said drain means having a cross-sectional area not less than the total cross-sectional area of said close clearance between the plate and the shaft.

References Cited in the file of this patent

UNITED STATES PATENTS

| | | |
|---|---|---|
| 2,391,577 | Larson | Dec. 25, 1945 |
| 2,439,917 | Anderson | Apr. 20, 1948 |
| 2,536,784 | Tamm | Jan. 2, 1951 |